Figure 2:
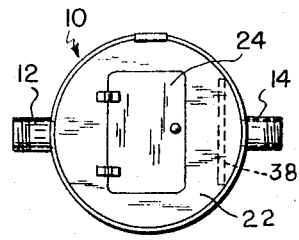

Feb. 14, 1967  W. E. HILL  3,303,621
GAS DRIER

Filed Nov. 30, 1964  2 Sheets-Sheet 1

INVENTOR.
WILKES E. HILL
BY
Teare, Fetzer & Teare
ATTORNEYS

Feb. 14, 1967 W. E. HILL 3,303,621
GAS DRIER

Filed Nov. 30, 1964 2 Sheets-Sheet 2

INVENTOR.
WILKES E. HILL
BY
Teare, Fetzer & Teare
ATTORNEYS

United States Patent Office 3,303,621
Patented Feb. 14, 1967

3,303,621
GAS DRIER
Wilkes E. Hill, Erie, Pa., assignor to Van Products Company, Erie, Pa., a corporation of Pennsylvania
Filed Nov. 30, 1964, Ser. No. 414,709
13 Claims. (Cl. 55—388)

This invention relates in general to the art of drying, and more particularly to a drying device for removing moisture and other impurities from pressurized air or gas.

There are various arrangements known in the art and/or gas drying art for removing moisture and other impurities from pressurized air or gas, and it is known in the art to pass the air or gas through a bed of deliquescent desiccant material, to remove moisture and/or other impurities therefrom.

The present invention provides a novel arrangement of deliquescent desiccant type compressed air or gas drier which makes more effective the removal of moisture by the deliquescent desiccant material, but a drier that is of simplified construction, which facilitates the manufacture of the drier. The invention also provides a drier that utilizes the walls of the container or tank for aiding in cooling of the air or gas as it passes through the drier.

Accordingly, an object of the present invention is to provide a novel drier for removing moisture from pressurized air or gas.

Another object of the invention is to provide a compressed air or gas tank-like drier of the chemical deliquescent desiccant type including an upper chamber containing the desiccant bed and a lower chamber, and comprising means for directing the incoming compressed air or gas to generally the central portion of the lower chamber of the tank, and then to cause a violent impact of the air against a substantially horizontally oriented abutment in the tank, to cause violent dispersal of the air in the lower chamber, whereby the incoming air is subjected to a thorough treatment by the solution of desiccant material flowing down from the bed of desiccant prior to movement of the air through the desiccant bed. The air is then passed upwardly along the interior walls of the tank through passage means preferably defined by the aforementioned abutment, to subject the air to the generally cooler walls of the tank and to the downwardly flowing desiccant solution, after which the air passes through the bed of desiccant material and then out of the tank.

Another object of the invention is to provide a deliquescent desiccant type of air or gas drier comprising a generally vertically oriented tank or container having an upper chamber containing a bed of the deliquescent desiccant, and a lower chamber, and having an inlet for the pressurized air or gas that is to be dried, and wherein passageway means is provided in the tank for directing the incoming air from the inlet to substantially the central portion of the lower chamber of the tank, and then directing it upwardly into violent impact with a generally horizontally arranged abutment in the tank, thus causing violent dispersal of the air throughout the lower chamber of the tank, which subjects the inlet air to a mist of the solution of desiccant dripping down from the bed of desiccant in the upper chamber. The air is then passed through passage means adjacent the interior periphery of the tank defined by the aforementioned abutment, whereupon the air is subjected to the generally colder walls of the tank to cause further cooling of the pressurized air, and again subjects the air to the solution of desiccant from the desiccant bed. After passing through the aforementioned passage means, the air passes into the bed of deliquescent desiccant material which is in generally pellet or particle form, whereupon the desiccant material further removes moisture from the air. The air then passes upwardly above the desiccant bed and out through an exit opening in the tank.

Figure 4:
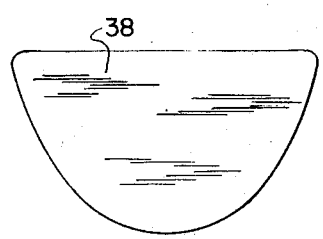
Figure 1:
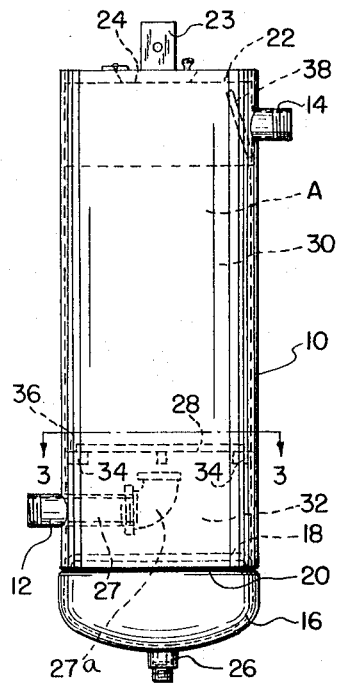
Figure 3:
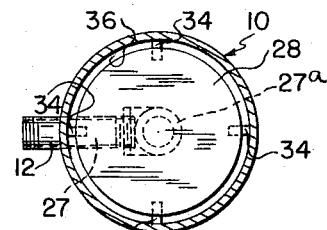
Figure 6:
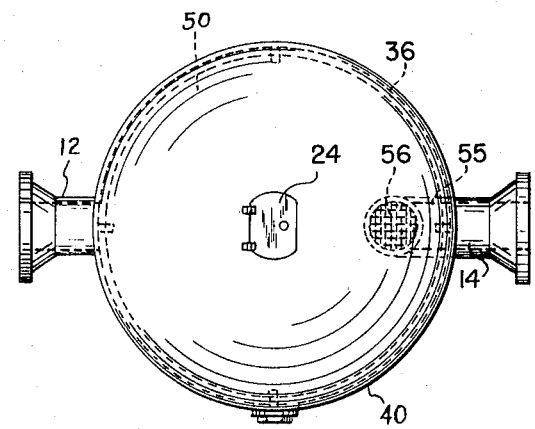
Figure 7:
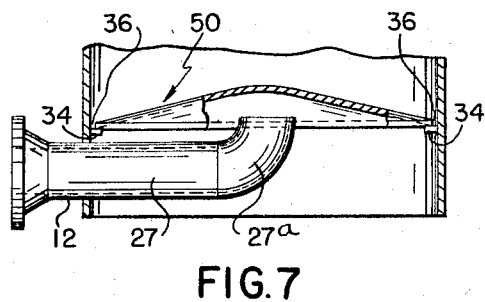
Figure 5:
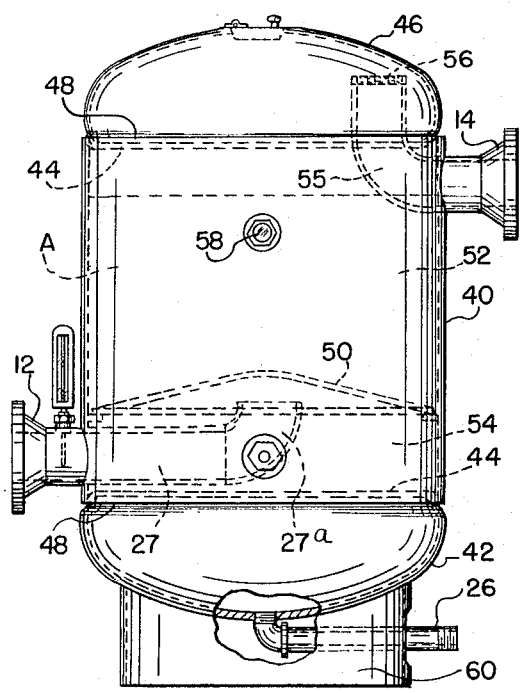

Other objects and advantages of the invention will be apparent from the following description taken in conjunction with the accompanying drawings wherein:

FIG. 1 is an elevational view of a drier embodying the instant invention;
FIG. 2 is a top plan view of the drier of FIG. 1;
FIG. 3 is a sectional view taken generally along the plane of line 3—3 of FIG. 1, looking in the direction of the arrow;
FIG. 4 is an enlarged elevational view of a baffle plate used in conjunction with the outlet of the drier;
FIG. 5 is an elevational view of another embodiment of drier embodying the invention;
FIG. 6 is a top plan view of the drier of FIG. 5;
FIG. 7 is a fragmentary partially broken, vertical sectional view of the FIGS. 5 and 6 drier, illustrating in particular the relationship between the inlet passageway and the horizontally oriented abutment in the drier.

Referring now again to the drawings and in particular to FIGS. 1 to 3 thereof, there is shown a drier comprising a preferably metal tank or enclosure 10 which, in the embodiment illustrated, is of generally cylindrical configuration, having an inlet 12 for receiving pressurized air or gas, and an outlet 14 for exhausting the air or gas from the tank.

The bottom portion of the tank is preferably formed from a separate cup-shaped member 16, which has a reduced diameter portion 18 at its upper end, received in the cylindrical bottom opening in the cylindrical section of the tank, and which may then be welded along the external juncture thereof, as at 20. The upper end of the tank may be defined by a generally flat plate-like portion 22, secured in the upper opening in the cylindrical shell of the tank, as by means of welds, to form a fluid tight container. A bracket 23 may be provided for suspending the tank on a wall or support.

The upper wall 22 of the tank may be provided with an airtight filler hatch 24. Filler hatch 24 may be used for replenishment of the chemical deliquescent desiccant utilized in the tank for drying the air or gas. A drain 26 may be provided in the bottom section 16 of the tank for continuously draining from the tank, the liquid which flows down from the bed A of deliquescent desiccant material. The drain is preferably provided with a suitable trap, not shown, in any conventional manner.

Recording means such as a thermometer and a pressure gauge (not shown) may be mounted on the tank for indicating respectively the temperature and the pressure of the air or gas in the tank.

The air inlet 12 comprises a conduit or passageway means 27 extending from the inlet inwardly to approximately the vertical axial center of the tank, where it curves abruptly upwardly as at 27a to open in an upward direction.

An imperforate plate 28 is mounted in the tank generally horizontally, and divides the tank into a relatively large upper chamber 30 and a relatively smaller lower chamber 32. The plate 28 may be mounted in the tank by means of spaced lugs 34 secured to the interior surface of the tank, with the plate 28 being preferably secured to the lugs.

Plate 28 is of a smaller diameter than the interior diameter of the tank, as best seen in FIG. 3, thus leaving passage means 36 extending about the plate periphery, and through which the pressurized air or gas passes into the bed of desiccant. A spacing of approximately ⅜ inch between the interior surface of the tank and the periphery of plate 28 has been found to be satisfactory.

A baffle plate 38 is preferably provided in association with the outlet 14, with the baffle plate being disposed obliquely with respect to the interior surface of the tank, and which may be attached thereto as by means of welds. The plate 38 preferably extends above the outlet 14 and terminates below the oulet, to separate the outlet 14 from the tank interior except at the upper portion of the plate 38, and just below the top wall 22 of the tank.

The deliquescent desiccant material is preferably a mixture of hygroscopic materials, such as for instance sodium hydroxide granules and dendritic sodium chloride granules, in non-compacting pellet or tablet form, which are adapted to absorb moisture from the air or gas as it passes through the desiccant material and form a solution which oozes or flows down from the bed, and through the passage means 36. The pellets of desiccant are of such size that they will not flow through passage means 36, and such bed of desiccant pellets form a great multitude of tortuous passageways through which the air or gas flows prior to exiting from the drier.

Operation of the drier may be as follows:

The pressurized air or gas initially enters the tank at the inlet 12 and is directed to the axial center thereof by means of the pipe or passageway means 27, and then the air or gas is directed upwardly where it impinges on the undersurface of the plate 28, causing the inlet air to be dispersed violently in all generally radial directions within the lower chamber 32 of the tank. The incoming air or gas may be at pressures ranging from slightly above atmospheric to as high as 20,000 p.s.i., and preferably is at a temperature below approximately 100° F.

The chemical solution of desiccant dripping down from the bed of desiccant pellets and through the passage 36 defined by the plate 28, is exposed to this violent dispersal of air or gas in the lower chamber and forms a mist, and since the solution contains liquefied desiccant, moisture is removed from the incoming air or gas prior to its actual passage up through the passage means 36 and into the bed of desiccant. The violently agitated air also engages the interior surfaces of the tank in the lower chamber, which are generally at a substantially lower temperature than the temperature of the incoming air, and further cools the air to cause moisture removal therefrom.

The air then passes up through the passage 36 defined by the plate 28, and into the tabletized bed of desiccant material, and passes through the many tortuous passageways defined by this bed of deliquescent desiccant. It will be seen that the air is positively caused to flow into engagement with the interior surface of the tank and also is positively subjected to the solution of desiccant from the bed, as the air or gas flows through passage means 36.

The air after passing through the bed, flows upwardly above the bed and is caused to engage the top wall 22 of the tank in order to pass the baffle plate 38, and then is withdrawn through the outlet 14.

Referring now to FIGS. 5, 6 and 7, there is shown another embodiment of the drier wherein the tank 40 has both a lower cup-shaped end 42, with a reduced size upper portion 44 for receipt in the cylindrical bottom opening of the cylindrical section of the tank, and an upper cup-shaped portion 46 having a similar reduced size portion 44 for receipt in the upper cylindrical opening in the cylindrical section of the tank, and which are welded along the juncture seam as at 48, to form a fluid tight container.

In this embodiment, the imperforate plate 50, which divides the tank into the relatively large upper chamber 52 and a relatively smaller lower chamber 54, is of inverted generally dished configuration, as can be best seen in FIG. 7 of the drawings. Thus the inlet air entering the inlet 12 and directed to the substantially vertical axial center of the tank and then upwardly by passageway means 27, 27a, impinges against such dished divider plate 50, which causes the air to be directed in all directions not only generally radially outwardly but also in an obliquely downward direction, where it moves violently in the lower chamber 54. This violent agitation of the inlet air in the chamber 54, thoroughly mixes it with the mist of the solution of deliquescent desiccant coming from the bed A of desiccant tablets, and prior to its movement up through the passage 36 defined by the plate 50. It will be seen that the plate 50 is of a smaller diameter than the interior diameter of the tank in a similar manner as that in connection with the first embodiment.

This generally downwardly directing of the inlet air insures good contact of the air or gas with the generally cooler walls of the tank and with the mist of desiccant solution, prior to passage of the air up through the bed. The top sloping surface of the plate 50 also facilitates the draining of the solution from the bed down through the passage 36 and therefore insures a good exposure of the inlet air to the solution draining from the bed of desiccant. The slope of the top surface of plate 50 also aids in automatically moving the desiccant pellets toward the sides of the tank as the pellets dissolve.

After the air passes through the bed A, it passes upwardly through outlet 14 which embodies a generally L-shaped configuration 55, so that the air has to pass up above the bed into substantial contact with the top wall portion 46 of the tank, and then down through screened inlet 56 on outlet passageway 55.

In this embodiment there is shown a sight glass 58 in the wall of the tank for visually indicating when the level of desiccant gets too low, and there is also provided a foot ring 60 for supporting the tank in upright condition on the floor or ground.

It will be noted that the inlet passageway 27, 27a preferably terminates within the confines of the dished plate 50, so that such inlet air egressing from the open end of passageway 27a is not interfered with by the violently moving air in the lower chamber.

From the foregoing discussion and accompanying drawings it will be seen that the invention provides a novel tank-like deliquescent desiccant drier which is simplified in construction and which will operate effectively to remove moisture from pressurized air or gas, and which causes the inlet air to be violently dispersed in the lower chamber of the drier tank and effectively exposed to a solution of desiccant coming from a bed of desiccant in the upper chamber of the tank, and which causes a positive exposure of the air to the tank walls, for lowering the temperature of the air prior to its passage through the bed of desiccant material.

The term "gas" which is used in the hereafter set forth claims will be understood to include "air," since of course air is a gas.

The terms and expressions which have been used are used as terms of description and not of limitation and there is no intention in the use of such terms and expressions of excluding any equivalents of any of the features shown or described, or portions thereof, and it is recognized that various modifications are possible within the scope of the invention claimed.

I claim:

1. A drier for compressed gas comprising an enclosure having a gas inlet and a gas outlet, generally horizontal means in said enclosure adapted for supporting a bed of deliquescent desiccant material on the upper surface thereof, said horizontal means comprising a generally imperforate substantially planar member dividing said enclosure into an upper chamber and a lower chamber and extending transversely across said enclosure a sufficient amount to define in conjunction with the interior surface of the enclosure passage means disposed adjacent said interior surface, said inlet communicating with said lower chamber and said outlet communicating with said upper chamber, a drain opening in said lower chamber for removing a solution of desiccant draining down from the desiccant bed, said inlet being disposed above said drain opening, said passage means being operative to cause inlet gas to flow into contact with the enclosure interior surface prior to passing through the bed of desiccant material and to cause exposure of the inlet gas to desiccant solution from the bed prior to passage of the inlet gas into the bed, and passageway means coupled to said inlet for directing inlet gas to approximately the vertical axial center of the enclosure and in close proximity to said member so that the inlet gas will be directed upwardly to violently impinge on the underside of said member, thereby dispersing the inlet gas upon its emission into said lower chamber.

2. A drier for compressed gas comprising, an enclosure having a gas inlet and a gas outlet, generally horizontal means in said enclosure adapted for supporting a bed of deliquescent desiccant material on the upper surface thereof, said horizontal means dividing said enclosure into an upper chamber and a lower chamber, said inlet communicating with said lower chamber and said outlet communicating with said upper chamber, a drain opening in said lower chamber for removing a solution of desiccant draining down from the desiccant bed, said inlet being disposed above said drain opening, said horizontal means comprising a generally imperforate member of inverted dished-shaped configuration extending transversely across said enclosure a sufficient amount to define in conjunction with the interior surface of the enclosure passage means disposed adjacent said interior surface, said passage means being operative to cause inlet gas to flow into contact with the interior surface of the enclosure prior to passing through the bed of desiccant material and to cause exposure of the inlet gas to desiccant solution from the bed prior to passage of the inlet gas into the bed, and passageway means coupled to said inlet for directing inlet gas to approximately the vertical axial center of the enclosure and in close proximity to said member so that the inlet gas will be directed upwardly to violently impinge on the underside of said member, thereby dispersing the inlet gas upon its emission into said lower chamber.

3. A drier in accordance with claim 2 wherein said passageway means terminates within the confines of said dished-shaped imperforate member.

4. A drier for compressed gas comprising an enclosure having a gas inlet and a gas outlet, generally horizontal means in said drier adapted for supporting a bed of deliquescent desiccant material on its upper surface in the drier, said horizontal means comprising a generally imperforate member of inverted dished-like configuration extending across the enclosure in spaced relation to the interior surface of the enclosure to define passage means adjacent the interior surface of said enclosure and about the periphery of said horizontal means, said horizontal means dividing the enclosure into an upper chamber and a lower chamber, said inlet communicating with said lower chamber and said outlet communicating with said upper chamber, a drain opening in said lower chamber for removing a solution of desiccant draining down from the desiccant bed, said inlet being disposed above said drain opening, and passageway means coupled to said inlet for directing inlet gas substantially to the vertical axial center of said enclosure in said lower chamber and then upwardly, to terminate in predetermined spaced relation to the underside of said horizontal means, so that the inlet gas will impinge violently in an upward direction on the underside of said horizontal means and will be dispersed violently in the lower chamber prior to passing through said passage means.

5. A drier in accordance with claim 4 wherein said passageway means terminates within the confines of said horizontal means.

6. A drier in accordance with claim 4 wherein the bottom of said enclosure is of cup-shaped configuration.

7. A drier in accordance with claim 4 including means associated with said outlet for causing the air after flowing through the bed of deliquescent desiccant material to pass upwardly into engagement with the top wall of said enclosure.

8. A drier in accordance with claim 4 wherein both the top and bottom walls of said enclosure are of cup-shaped configuration.

9. A drier in accordance with claim 4 wherein said enclosure comprises a tubular-like central portion, cup-shaped like upper and lower portions secured to the respective upper and lower ends of said tubular portion, with said upper and lower portions each having an end section of reduced diameter received in snug relation in said central portion, and means securing the upper and lower portions to said central portion in fluid-tight relationship.

10. A drier for compressed gas comprising an enclosure having side walls and top and bottom walls, generally horizontally oriented means supported in said enclosure intermediate the top and bottom walls thereof and defining an upper chamber and a lower chamber in said enclosure, said horizontal means comprising a generally imperforate substantially planar member supported in spaced relation to the interior surface of said enclosure to define a peripheral passage about said horizontal means through which inlet gas is adapted to pass, a bed of deliquescent desiccant pellets supported on said horizontal means, a gas inlet opening into said lower chamber, a gas outlet opening into said upper chamber above said bed of desiccant, a drain opening in said lower chamber for removing a solution of desiccant draining down from the desiccant bed, said inlet being disposed above said drain opening; passageway means connected to said inlet for directing inlet gas to substantially the vertical axial center of said enclosure in said lower chamber and then directing it upwardly toward the underside of said horizontal means, said passageway means terminating in predetermined spaced relation to said horizontal means so that the inlet gas will violently impinge the underside of said horizontal means and be dispersed throughout said lower chamber prior to passing through said passage defined by said horizontal means, and means communicating with said upper chamber for replenishing said bed of desiccant pellets as the latter dissolves.

11. A drier for compressed gas comprising an enclosure including a generally cylindrical like central portion and upper and lower end portions, said end portions being of cup-shaped configuration and having reduced size end sections received interiorly of said central portion, welds connecting the upper and lower end portions to said central portion in fluid sealing relation, a generally horizontally oriented member supported interiorly of said enclosure and dividing the latter into a relatively large upper chamber and a relatively smaller lower chamber, a bed of deliquescent desiccant pellets supported on said horizontal means in said upper chamber and adapted to remove moisture from inlet gas, said horizontal means being of inverted dish-shaped configuration and being of a diameter smaller than the interior diameter of said central portion of said enclosure, to define a generally peripheral passage extending about said horizontal means in juxtaposed relation to the interior surface of said central portion, for passage of inlet gas therethrough, a gas inlet opening into said lower chamber, pasageway means coupled to said inlet for directing inlet gas to substantially the vertical axial center of said enclosure in said lower chamber, and then upwardly to terminate in spaced relationship to said horizontal means, said passageway means terminating within the confines of said dish-shaped horizontal means, a drain in said lower chamber for continuously removing a solution of desiccant draining down from said bed through said passage and into said lower chamber, means in said upper end portion for replenishing said bed of desiccant as the latter dissolves, a gas outlet opening into said upper chamber above said bed, and means associated with said outlet for causing the gas after passing through said bed to engage the top wall of said upper end portion of said enclosure prior to passing out said outlet.

12. A drier in accordance with claim 11 wherein said horizontal means is spaced from said interior surface of said enclosure approximately three-eighths of an inch around its periphery.

13. A drier for compressed ags comprising an enclosure having a gas inlet and a gas outlet, generally horizontal means in said drier adapted for supporting a bed of deliquescent desiccant material on its upper surface in the drier, said horizontal means comprising, a generally imperforate member of substantially planar configuration extending across the enclosure in spaced relation to the interior surface of the enclosure to define passage means adjacent the interior surface of said enclosure and about the periphery of said horizontal means, said horizontal means dividing the enclosure into an upper chamber and a lower chamber, said inlet communicating with said lower chamber and said outlet communicating with said upper chamber, a drain opening in said lower chamber for removing a solution of desiccant draining down from the desiccant bed, said inlet being disposed above said drain opening, and passageway means coupled to said inlet for directing inlet gas substantially to the vertical axial center of said enclosure in said lower chamber and then upwardly to terminate in predetermined spaced relation to the underside of said horizontal means, so that the inlet gas will impinge violently in an upward direction on the underside of said horizontal means and will be dispersed violently in the lower chamber prior to passing through said passage means.

References Cited by the Examiner
UNITED STATES PATENTS

| | | | |
|---|---|---|---|
| 2,195,565 | 4/1940 | Fricke | 55—387 X |
| 2,404,468 | 7/1946 | Vokes et al. | 55—387 |
| 3,050,920 | 8/1962 | Norton | 55—388 |
| 3,221,478 | 12/1965 | Norton | 55—388 X |

REUBEN FRIEDMAN, *Primary Examiner.*

J. ADEE, *Assistant Examiner.*